United States Patent [19]

DeVecchi

[11] 4,371,386

[45] Feb. 1, 1983

[54] FILTER HOUSING

[75] Inventor: Francisco DeVecchi, Farmington Hills, Mich.

[73] Assignee: Veco International, Inc., Southfield, Mich.

[21] Appl. No.: 265,260

[22] Filed: May 18, 1981

[51] Int. Cl.³ .............................................. B01D 46/10
[52] U.S. Cl. ....................................... 55/338; 55/502; 98/40 D
[58] Field of Search ....................... 55/484, 338, 502; 98/40 D

[56] References Cited

U.S. PATENT DOCUMENTS

| 2,709,954 | 6/1955 | Baker | 98/36 |
|---|---|---|---|
| 2,999,448 | 9/1961 | Abler et al. | 98/115 |
| 3,057,468 | 10/1962 | Allan, Jr. | 206/46 |
| 3,158,457 | 11/1964 | Whitfield | 55/472 |
| 3,186,149 | 6/1965 | Ayers | 55/387 |
| 3,229,611 | 1/1966 | Berger, Jr. | 98/115 |
| 3,251,177 | 5/1966 | Baker | 55/385 |
| 3,284,148 | 11/1966 | Ramniceanu | 312/209 |
| 3,301,167 | 1/1967 | Howard et al. | 98/115 |
| 3,303,839 | 2/1967 | Tavan | 126/299 |
| 3,318,076 | 5/1967 | Baker | 55/350 |
| 3,336,855 | 8/1967 | Messina | 98/115 |
| 3,363,539 | 1/1968 | Taylor et al. | 98/115 |
| 3,367,257 | 2/1968 | Raider et al. | 98/33 |
| 3,368,523 | 2/1968 | Becker | 118/49 |
| 3,418,915 | 12/1968 | Marble | 98/40 |
| 3,426,512 | 2/1969 | Nesher | 55/410 |
| 3,465,666 | 9/1969 | Knab | 55/484 |
| 3,470,679 | 10/1969 | Ramsey | 55/484 |
| 3,479,947 | 11/1969 | Myers | 98/116 |
| 3,486,311 | 12/1969 | Allan, Jr. | 88/388 |
| 3,494,112 | 2/1970 | Deckas | 55/470 |
| 3,511,162 | 5/1970 | Truhan | 98/36 |
| 3,529,406 | 9/1970 | Allan, Jr. et al. | 55/502 |
| 3,540,079 | 11/1970 | Bush | 18/19 |
| 3,616,624 | 11/1971 | Marsh | 55/472 |
| 3,629,999 | 12/1971 | Marsh et al. | 55/97 |
| 3,665,917 | 5/1972 | Jensen | 128/2 R |
| 3,686,836 | 8/1972 | RabiHood et al. | 55/467 |
| 3,703,801 | 11/1972 | Deckas | 55/385 |
| 3,715,972 | 2/1973 | Kelso et al. | 98/115 |
| 3,728,866 | 4/1973 | Layton | 62/126 |
| 3,747,505 | 7/1973 | Turko | 98/115 |
| 3,780,503 | 12/1973 | Smith | 55/484 |
| 3,838,556 | 10/1974 | Finger | 55/385 |
| 3,880,625 | 4/1975 | Shook | 55/484 |
| 3,895,570 | 7/1975 | Eagleson, Jr. | 98/115 |
| 3,897,229 | 7/1975 | Lada | 55/467 |
| 3,923,482 | 12/1975 | Knab et al. | 55/412 |
| 3,935,803 | 2/1976 | Bush | 98/36 |
| 3,986,850 | 10/1976 | Wilcox | 55/355 |
| 4,016,809 | 4/1977 | Austin | 98/115 |
| 4,030,518 | 6/1977 | Wilcox | 137/246 |
| 4,037,830 | 7/1977 | Poluzzi et al. | 269/21 |
| 4,055,075 | 10/1977 | Allan et al. | 73/40.7 |
| 4,063,495 | 12/1977 | Duvlis | 98/36 |
| 4,082,525 | 4/1978 | Allan | 55/355 |
| 4,098,174 | 7/1978 | Landy | 98/115 |
| 4,100,847 | 7/1978 | Norton | 98/115 |
| 4,175,936 | 11/1979 | Lough et al. | 55/502 |
| 4,178,159 | 12/1979 | Fecteau | 55/484 |
| 4,217,121 | 8/1980 | Fichter | 55/502 |

FOREIGN PATENT DOCUMENTS

| 1009495 | 5/1977 | Canada | 98/42 |
|---|---|---|---|
| 2130255 | 6/1971 | Fed. Rep. of Germany . | |
| 52-26660 | 2/1977 | Japan | 55/502 |
| 7104009 | 11/1971 | Netherlands | 55/502 |
| 1198920 | 7/1970 | United Kingdom . | |
| 255528 | 3/1970 | U.S.S.R. . | |

Primary Examiner—Bernard Nozick
Attorney, Agent, or Firm—Harness, Dickey & Pierce

[57] ABSTRACT

An improved filter holding device for an air filter that forms a chamber around the periphery of the air filter. A vacuum is created within the chamber to carry any unfiltered air to the upstream side of the filter and thus prevent any air from bypassing the filter and contaminating a clean room.

18 Claims, 4 Drawing Figures

U.S. Patent  Feb. 1, 1983  4,371,386
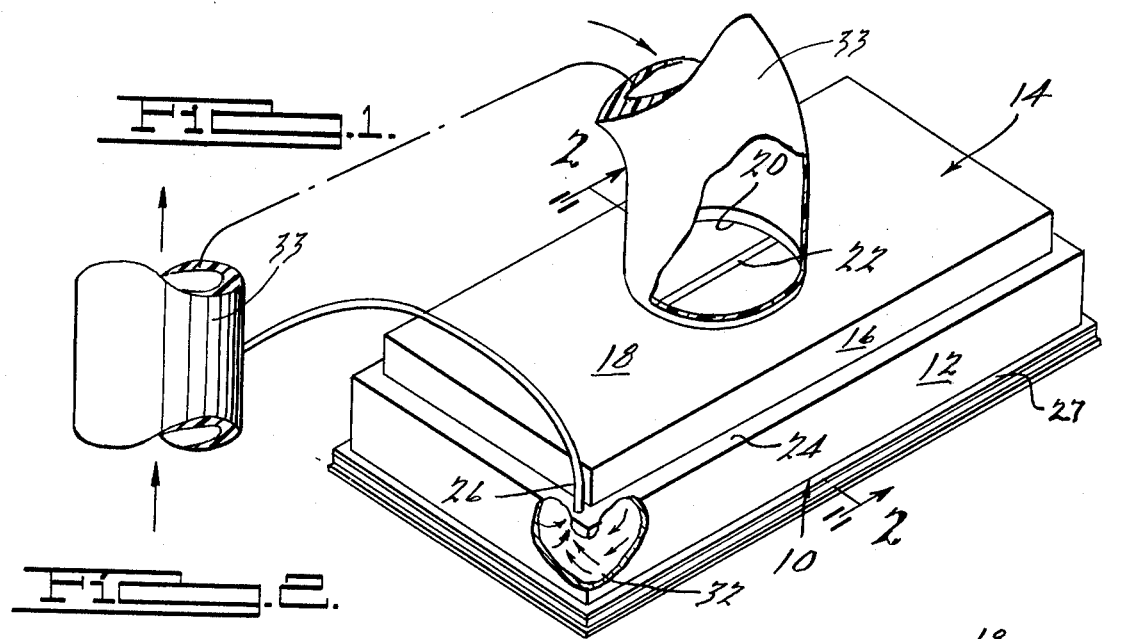
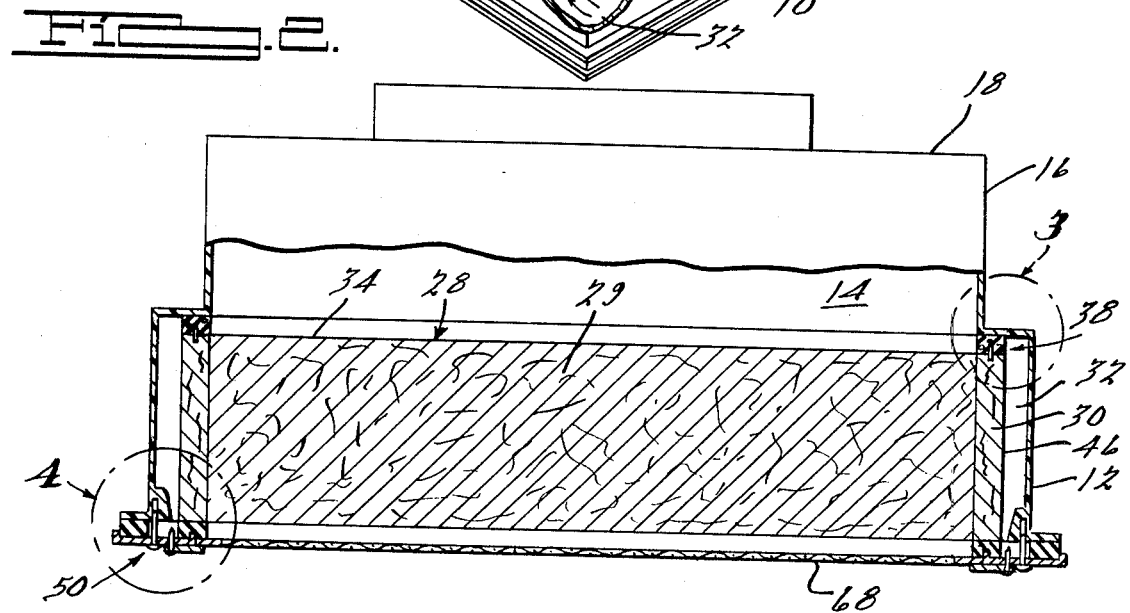
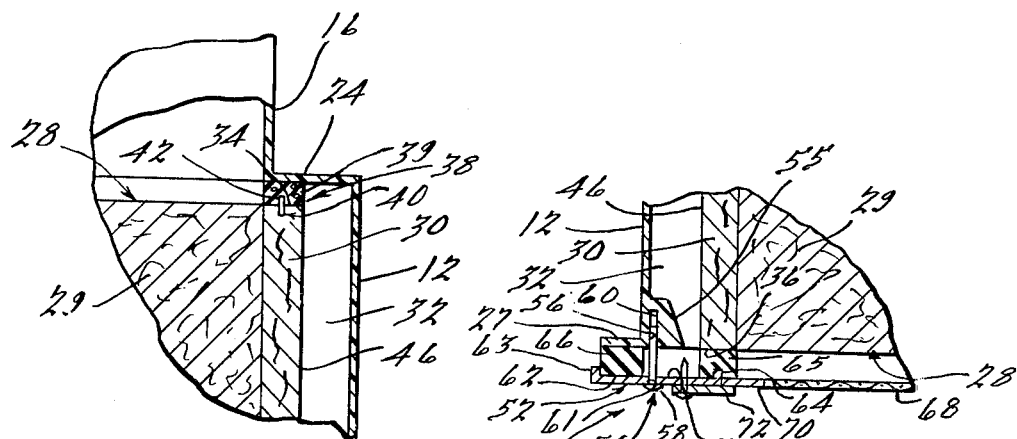

FILTER HOUSING

BACKGROUND AND SUMMARY OF THE INVENTION

This invention relates to an improved filter holding device for sealably mounting a filter in a supporting structure. The improved holding device is particularly adapted for use with filters of the type that are made in the form of a filter pack. The invention works in conjunction with such filters to supply virtually contaminant-free air to critical production or laboratory areas such as clean rooms or white rooms.

In the present age of advanced technology, there is an increasing requirement for particulate-free and/or bacteria-free environments. These environments are typically referred to as clean rooms and to provide such clean rooms with the required contaminant-free air, it is a practice to circulate the air through a bank of one or more filters. In many clean rooms, the efficiency required in removing particles from the air must exceed 99.99% of particles larger than 0.3 microns. This high level of particulate filtration is achieved by the use of what are in the industry generally called "absolute" or "HEPA" filters. These filters are comprised of suitable filtering media, having corresponding efficiencies, which are placed in a filter frame and sealed with adhesives to form filter packs. The filter pack is in turn typically mounted and sealed into a somewhat rigid supporting structure.

A known method of sealably mounting the filter packs into the support structure comprises a gasket of neoprene or rubber or other similar material that is placed between the filter pack and the supporting structure or holding device. The gasket runs around the periphery of the filter pack and is designed to contact a "knife-edge" peripheral flange of the holding device. A clamping mechanism provides a force to press the filter pack and its gasket against the knife-edge to prevent the leakage of air that is unfiltered, and hence contaminated, from entering the clean room.

This gasket sealing method that is used by many filtering applications becomes unsatisfactory because the neoprene gasket or other rubbers tend to deteriorate or lose their elasticity with the passage of time. This presents a serious problem since the seal around the perimeter of the filter pack may now allow unfiltered air past the filter and into the clean room environment, thereby defeating the original purpose of filtering.

Another sealing method comprises a filter pack being surrounded and supported in the usual manner by a holding device. The downstream face of the holding device comprises a continuous circumferential or peripheral channel that is initially filled with a fluid having a high consistency at room temperature such as household petrolatum. The sealed frame of the filter pack has a downstream protruding peripheral edge that corresponds to the channel in such a manner that when the filter pack is mounted in the holding device the protruding edge of the filter pack frame enters the fluid-filled channel and results in a more or less absolute air seal between the two members.

However, although the fluid-seal approach appropriately performs its function of preventing unfiltered air leaks, the initial cost of the petrolatum and the inconvenience in installing and maintaining the fluid in the channels makes this method highly unsatisfactory.

The present invention provides a filter holding device that combines with a filter pack to entirely eliminate unfiltered air leakage around the filter pack. Further, this invention eliminates unfiltered air leakage around the filter pack inexpensively and efficiently. More particularly, this invention provides a filter holding device that does not rely on household petrolatum or other similar fluid as a sealing element.

The present invention has the advantages of providing a filtering assembly that functions with a conventional filter pack to entirely eliminate unfiltered air leakage around the filter pack into a clean room and yet which allows the filter pack to be easily and quickly assembled in, or removed from, the filter holding device. Moreover, it is an advantage of the present invention to provide a filtering system that is quick and efficient to initially install in a clean room environment.

Accordingly, this invention relates to an improved filter holding device for both sealing and supporting a filter pack. The holding device combines with the periphery of the filter pack to form a chamber between the filter pack and the holding device. This chamber is subjected to a low or negative pressure relative to the pressure outside the chamber, thus creating a vacuum within the chamber so that if any unfiltered air leaks past a sealing means on the upstream side of the filter pack and housing device, is is prevented from entering and contaminating the clean room.

The vacuum is attained by connecting the chamber surrounding the filter pack frame to the air return or an additional blower located on the upstream side of the filter pack. In the event a seal is not working properly, thereby allowing a contaminant to pass into the chamber, the vacuum action will pick up the contaminant and carry it back to the upstream side of the filter where it can be discarded or re-filtered so as to prevent no risk of contaminating the clean room.

Additional advantages and features of the present invention will become apparent from the subsequent description and the appended claims taken in conjunction with the accompanying description.

BRIEF DESCRIPTION OF THE DRAWINGS

FIG. 1 is a perspective view showing the filter pack and improved filter holding device in assembled relationship and additionally showing a cut away view of one corner of the filter holding device illustrating the vacuum with the chamber.

FIG. 2 is a sectional view taken along the line 2—2 of FIG. 1.

FIG. 3 is an enlarged sectional view of the sealing means between the filter pack and the filter holding device taken within circle 3 of FIG. 2.

FIG. 4 is an enlarged sectional view of the clamping means between the filter pack and the filter holding device taken within circle 4 of FIG. 2.

DESCRIPTION OF THE PREFERRED EMBODIMENTS

Referring to the drawings and particularly to FIG. 1, there is illustrated the improved filter holding device indicated generally at 10. Filter holding device 10 includes an outer chamber wall 12, as will hereinafter be further described, and a plenum 14 that defines an airspace within filter holding device 10 having sidewalls 16 and a top 18. Top 18 of plenum 14 also has an opening 20 for receiving unfiltered air and can be fitted with an adjustable damper 22 for controlling the flow of such unfiltered air. The construction of filter holding device 10 is preferably fiberglas, but can be metal, plastic, or any other suitable material.

Filter holding device 10 also contains a chamber ceiling 24 that extends inwardly from the outer chamber wall 12 and together with outside chamber wall 12, partially defines a chamber 32. Chamber ceiling 24 contains a hose 26 that transports contaminated or unfiltered air from within chamber 32 to an air return to be re-filtered or, alternatively, to be discharged. This transportation of the contaminated air is accomplished by creating a vacuum of low or negative pressure within chamber 32 and hose 26 relative to pressure outside chamber 32 and hose 26. Hose 26 may be made of teflon, plastic, copper, metal alloys, or other suitable materials and can be flexible or rigid depending upon the specific application. Filter holding device 10 also includes a lip 27 that protrudes perpendicularly outward from the bottom of outer chamber wall 12.

Filter holding device 10 is designed to removably retain and sealably mount an air filtration device 28 (hereinafter "filter") as shown in FIGS. 2, 3, and 4. Filter 28 is typically made in the form of a filter pack by placing with several filtering materials 29 with their corresponding filtering efficiencies in a rigid frame 30 and sealing the filtering materials 20 within frame 30 with various types of adhesive. Filter 28 may be of any suitable commercially available type such as are generally called, for example, "absolute" or "HEPA" filters in the industry. The air-filtering ability of these filters is such that 99.99% of all particles larger than one-third micron are removed from the air stream passing through the filter.

As can more readily be seen in FIGS. 2, 3, and 4, filter 28 has an upstream face 34 and a downstream face 36 of filter frame 30. Plenum 14 of filter holding device 10 lies above upstream face 34. Attached to chamber ceiling 24 of filter holding device 10 is a sealing means 38 that comes into sealing contact with a knife-edge 40 that is embedded in upstream face 34 of filter 28 when filter 28 is inserted into filter holding device 10. Sealing means 38 can be comprised of a foam, neoprene, or rubber first gasket 39 or other such suitable material. Sealing means, attached to chamber ceiling 24, is of a configuration that corresponds to upstream face 34 of filter frame 30. Knife-edge 40 is formed as a substantially vertical protrusion 42 that is embedded in filter frame 30 and protrudes upward therefrom to engage and make sealing contact with sealing means 38. Vertical protrusion 42 may be made from metal or any other similar material.

When filter 28 is placed within filter holding device 10, chamber 32 is defined substantially by outer chamber wall 12, chamber ceiling 24, an inner chamber wall 46 that is formed by the outside of filter frame 30, and a chamber bottom 47 that is formed by a channel bar 52 of filter holding device 10 as will be further described hereinbelow.

A clamping means 50 to removably retain filter 28 within filter holding device 10 is depicted in FIGS. 2 and 4. Clamping means 50 comprises a flat channel bar 52, a fastening means 54, and lip 27. Outer chamber wall 12 includes along its downward end a plurality of thickened portions 55. Thickened portions 55 contain insert holes 56. Fastening means 54 comprises a conventional bolt 58 and a corresponding insert 60 that is contained in insert hole 56 of thickened portion 55. Insert 60 is designed to receivably retain bolt 58 within insert hole 56 and therefore to thickened portion 55 of outer chamber wall 12. Insert 60 therefore facilitates both assembly of clamping means 50 and installation of filter 28 within filter holding device 10. Channel bar 52 includes a corresponding clamping hole 61 for receiving bolt 58 of fastening means 54.

Channel bar 52 is configured to have a body portion 62, an outer flange 63, and an inner flange 64. A second gasket 65 of substantially equivalent configuration as downstream face 36 of filter frame 30 is attached to downstream face 36 of filter frame 30. Second gasket 65 therefore lies between downstream face 36 and inner flange 64 of channel bar 52. Inner flange 64 of channel bar 52 is configured to have a periphery substantially equivalent to the average periphery of downstream face 36 of filter frame 30.

A third gasket 66 of substantially equivalent configuration as lip 27 is attached to the downstream side of lip 27. Body portion 62 of channel bar 52 is configured such that outer flange 63 extends upward just beyond lip 27 and third gasket 66. When channel bar 52 is clamped upward towards lip 27, inner flange 64 will engage second gasket 65 and form a seal much like first gasket 39 and knife-edge 40, and body portion 62 of channel bar 52 just inward of outer flange 63 will engage third gasket 66 to effect an overall seal at the bottom of chamber 32. Second and third gaskets 65 and 66 may be constructed or formed from the same material as first gasket 39.

In this manner, when channel bar 52 is clamped up towards lip 27 by fastening means 54, filter frame 30 and consequently filter 28 will be pressed upward to effect sealing contact between knife-edge 40 and gasket 39. Clamping means 50 acts also to removably retain filter 28 within filter holding device 10 and allow filter maintenance to be efficiently and economically performed.

A perforated screen 68 is designed to fit and be held in place inside the inner periphery of channel bar 52 to give the filter assembly an aesthetic and pleasing appearance and also to distribute the flow of air that passes through filter 28 evenly throughout the clean room. Perforated screen 68 may be constructed from anodized metal, plastic, or any other suitable material that has pleasing appearance, long life, and serves to uniformly distribute the air flow. Perforated screen 68 has a screen frame 70 that abutts up against second gasket 65 and is retained inside the inner periphery of channel bar 52 by metal tabs 72. Metal tabs 72 can be fastened to channel bar 52 by using a suitable removably fastener as shown. Perforated screen 68 may also be either welded or tacked to channel bar 52 during a manufacturing step or be formed as a part of channel bar 52 so as to facilitate on-the-job assembly and installation of the filer 28 within filter holding device 10.

The present invention then, relates to an improved filter holding device 10 that is designed and configured to form a chamber 32 when filter 28 is inserted and removably retained within filter holding device 10. Chamber 32 lies outwardly of filter 28 and is placed under low or negative pressure relative to pressure outside of chamber 32 so as to create a vacuum within. This vacuum is effected by connecting hose 26 to a return air blower or other such vacuum source. As can readily be seen, if any unfiltered and thus contaminated air leaks past the conventional first gasket 30, it will enter chamber 32 and be sucked by the vacuum therein along chamber 32 and out through hose 26 to be refiltered or discarded. Second gasket 62 and third gasket 66 are added to effect a more airtight chamber 32 and to facilitate the vacuuming process.

Accordingly, the present invention therefore operates to completely eliminate the leakage of unfiltered air into a clean room and thus prevents the purpose of the filters from being rendered ineffective. The invention accomplishes this feature of completely and efficiently eliminating unfiltered air leakage into a clean room in a very economical manner. The invention accomplishes this by enabling standard or conventional filter packs with standard or conventional knife-edges and gaskets to be used. There are no expensive petrolatum type fluid seals that must be used and that are awkward and painstaking to initially install. The improved filter holding device 10 with its unique system of creating a vacuum within a chamber that surrounds the periphery of the filter pack is substantially all that is necessary to convert conventional filter systems into ones that will completely eliminate the leakage of unfiltered air past the filter and into a clean room. The present invention furthermore is simple to install and maintain.

While it is apparent that the preferred embodiments of the invention disclosed are well calculated to provide the advantages and features above stated, it will be appreciated that the invention is susceptible to modification, variation and change without departing from the proper scope or fair meaning of the subjoined claims.

What is claimed is:

1. A device for sealably holding a filter, said device comprising:
    a filter comprising at least one type of filtering material sealed in a frame surrounding and supporting said filtering material, said filter having an upstream side and a downstream side,
    and a filter holding device that is configured to contain a first side running around the periphery of said filter holding device to form an outer chamber wall, a lip that extends outwardly from the bottom of said first side, a channel bar that is clamped to said lip to form a chamber floor, and a chamber ceiling that extends inwardly from said first side and substantially parallel to said lip,
    whereby said filter is inserted into said filter holding device to form a chamber around the periphery of said frame of said filter, said frame of said filter forming an inner chamber wall of said chamber, said chamber being connected to an air return for said filter thereby creating a vacuum within said chamber to remove any unfiltered air that bypasses said filter and leaks into said chamber,
    wherein said filter holding device further comprises:
        a plenum that defines an air space within said filter holding device above said upstream face of said filter, said plenum
        having a top and a sidewall, said top of said plenum comprising an opening for receiving unfiltered air, said opening being fitted with an adjustable damper for controlling the flow of said unfiltered air into said plenum,
        a knife-edge that is embedded in said upstream side of said filter frame, said knife-edge forming a substantially vertical protrusion from said upstream side of said filter frame,
        a first gasket attached to said chamber ceiling of said filter holding device, said knife-edge making sealing contact with said first gasket to prevent unfiltered air from bypassing said filter and leaking into said chamber,
        a clamping means to effect said sealing contact between said knife-edge and said first gasket, said clamping means comprising a channel bar, a fastening means, said lip, and channel bar holes in said channel bar to receive said fastening means and thereby clamp said channel bar up towards said lip after said filter has been inserted in said filter holding device, said channel bar being configured to have a body portion, an inner flange, and an outer flange, said inner flange being configured to have a periphery substantially equivalent to the average periphery of said downstream side of said filter frame, said body portion being configured such that said outer flange extends upwardly slightly beyond said lip,
        a second gasket and a third gasket, said second gasket being of substantially the same configuration as and being attached to said downstream side of said filter frame, said third gasket being of substantially the same configuration as and being attached to said lip, whereby said inner flange of said channel bar comes into sealing contact with said second gasket, and said body portion of said channel bar just inward of said outer flange of said channel bar comes into sealing contact with said third gasket when said channel bar is clamped up towards said lip of said filter holding device after said filter has been inserted in said filter holding device,
        a perforated screen removably fastened within the inner periphery of said channel bar, said perforated screen serving to evenly distribute the flow of air that passes through said filter, and
        a hose that is connected between said chamber ceiling and said air return, said hose being subjected to said vacuum and thereby serving to remove from said chamber any unfiltered air that bypasses said filter and leaks into said chamber.

2. A device for sealably holding a filter, said device comprising:
    a filter comprising at least one type of filtering material sealed in a frame surrounding and supporting said filtering material, said filter having an upstream side and a downstream side, wherein a knife-edge is embedded in said upstream side of said filter frame, said knife-edge forming a substantially vertical protrusion from said upstream side of said filter frame,
    and a filter holding device that is configured to contain a first side running around the periphery of said filter holding device to form an outer chamber wall, a lip that extends outwardly from the bottom of said first side, a channel bar that is clamped to said lip to form a chamber floor, and a chamber ceiling that extends inwardly from said first side and substantially parallel to said lip,
    whereby said filter is inserted into said filter holding device to form a chamber around the periphery of said frame of said filter, said frame of said filter forming an inner chamber wall of said chamber, said chamber being connected to an air return for said filter thereby creating a vacuum within said chamber to remove any unfiltered air that bypasses said filter and leaks into said chamber.

3. A device for sealably holding a filter as defined in claim 2, further comprising a sealing means attached to said chamber ceiling whereby unfiltered air is prevented from bypassing said filter and leaking into said chamber.

4. A device for sealably holding a filter as defined in claim 3, wherein said sealing means comprises a first gasket.

5. A device for sealably holding a filter as defined in claim 4, wherein said knife-edge makes sealing contact with said first gasket of said filter holding device.

6. A device for sealably holding a filter as defined in claim 5, wherein said gasket is made of a rubber composition.

7. A device for sealably holding a filter as defined in claim 5, further comprising a clamping means for removably retaining said filter within said filter holding device.

8. A device for sealably holding a filter as defined in claim 7, wherein said clamping means effects said sealing contact between said knife-edge and said first gasket.

9. A device for sealably holding a filter as defined in claim 8, wherein said clamping means comprises a channel bar, a fastening means, and said lip, said channel bar being configured to have a body portion, an inner flange, and an outer flange, said inner flange being configured to have a periphery substantially equivalent to the average periphery of said downstream side of said filter frame, said body portion being configured such that said outer flange extends upward slightly beyond said lip.

10. A device for sealably holding a filter as defined in claim 9, wherein said clamping means further comprises a second gasket and a third gasket, said second gasket being of substantially the same configuration as and being attached to, said downstream side of said filter frame, said third gasket being of substantially the same configuration as and being attached to, said lip.

11. A device for sealably holding a filter as defined in claim 10, wherein said fastening means comprises an insert and a bolt, said insert being embedded in an insert hole located in a thickened portion of said outer chamber wall along the bottom of said outer chamber wall, whereby said bolt protrudes through a channel bar hole in said body portion of said channel bar and is retainably engaged in said insert, thereby clamping said channel bar up towards said lip of said filter holding device after said filter has been inserted in said filter holding device.

12. A device for sealably holding a filter as defined in claim 11, whereby said inner flange of said channel bar comes into sealing contact with said second gasket, and said body portion of said channel bar just inward of said outer flange of said channel bar comes into sealing contact with said third gasket when said channel bar is clamped up towards said lip of said filter holding device after said filter has been inserted in said filter holding device.

13. A device for sealably holding a filter as defined in claim 10, whereby said second gasket and said third gasket effect a seal at the bottom of said chamber.

14. A device for sealably holding a filter as defined in claim 13, wherein said first gasket, said second gasket, and said third gasket are constructed from the same materials.

15. A device for sealably holding a filter as defined in claim 9, further comprising a perforated screen, whereby said perforated screen serves to evenly distribute the flow of air that passes through said filter.

16. A device for sealably holding a filter as defined in claim 15, wherein said perforated screen has a screen frame, said screen frame being removably retained within the inner periphery of said channel bar with a plurality of tabs, said tabs being fastened to said channel bar with a removable fastener.

17. A device for sealably holding a filter as defined in claim 15, wherein said perforated screen is tacked or welded to said channel bar.

18. A device for sealably holding a filter as defined in claim 17, wherein said perforated screen and said flat-bar are formed together as one part of said filter holding device.

* * * * *

UNITED STATES PATENT AND TRADEMARK OFFICE
CERTIFICATE OF CORRECTION

PATENT NO. : 4,371,386

DATED : February 1, 1983

INVENTOR(S) : Francisco DeVecchi

It is certified that error appears in the above-identified patent and that said Letters Patent is hereby corrected as shown below:

Col. 3, line 9, after "return" insert --33--.

Col. 3, line 26, "20" should be --29--.

Col. 3, line 27, "adhesive" should be --adhesives--.

Col. 4, line 53, "filer" should be --filter--.

Col. 4, line 65, "30" should be --39--.

Signed and Sealed this

Tenth Day of May 1983

[SEAL]

Attest:

Attesting Officer

GERALD J. MOSSINGHOFF

Commissioner of Patents and Trademarks